(No Model.) 2 Sheets—Sheet 1.

M. F. NORACONK.
CAR TRUCK.

No. 587,060. Patented July 27, 1897.

Witnesses
J. G. Hinkel
E. Everett Ells

Inventor
M. F. Noraconk
by Watson & Watson, Attorneys (No Model.) 2 Sheets—Sheet 2.

M. F. NORACONK.
CAR TRUCK.

No. 587,060. Patented July 27, 1897.

Witnesses
J. G. Hinkel
E. E. Ellis

Inventor
M. F. Noraconk
By Watson & Watson
Attorneys

UNITED STATES PATENT OFFICE.

MICHEAL F. NORACONK, OF MILTON, PENNSYLVANIA.

CAR-TRUCK.

SPECIFICATION forming part of Letters Patent No. 587,060, dated July 27, 1897.

Application filed March 24, 1897. Serial No. 629,086. (No model.)

*To all whom it may concern:*

Be it known that I, MICHEAL F. NORACONK, a citizen of the United States, residing at Milton, in the county of Northumberland and State of Pennsylvania, have invented certain new and useful Improvements in Car-Trucks, of which the following is a specification.

This invention relates to that class of car-trucks in which the wheels are mounted singly, the wheels of each truck being adapted to run on a single rail.

The present invention consists in a swiveled car-truck of the class described, consisting of two side frames, between which one or more wheels are mounted upon suitable bearings, the truck having a suitable connection with the car-body and also having springs interposed between the truck and the car-body.

The invention further consists in details of construction and arrangement which will be hereinafter pointed out.

Figure 1:
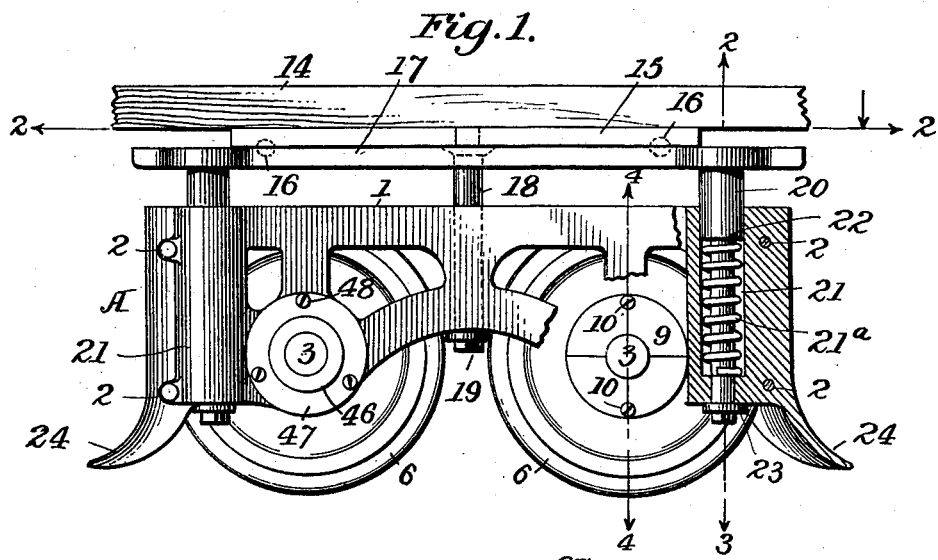
Figure 2:
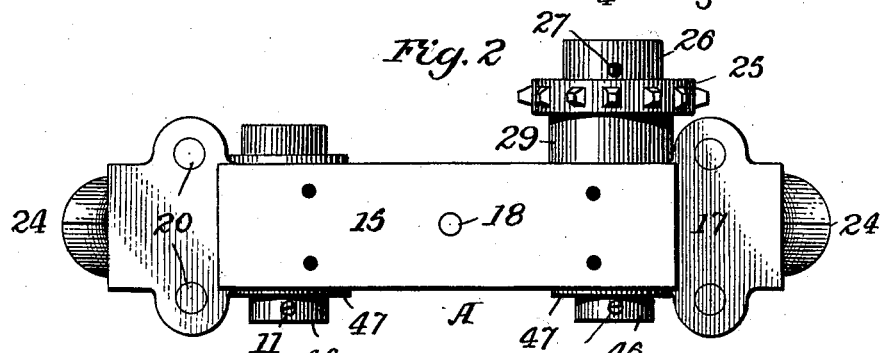
Figure 3:
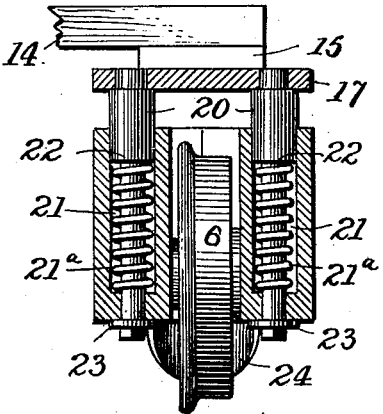
Figure 4:
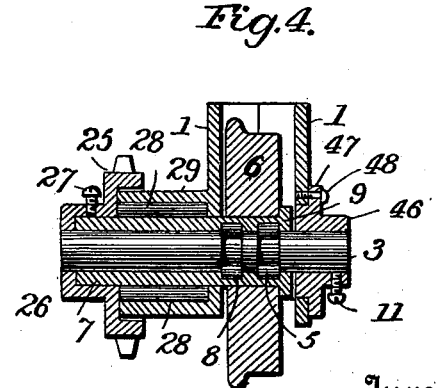
Figure 5:
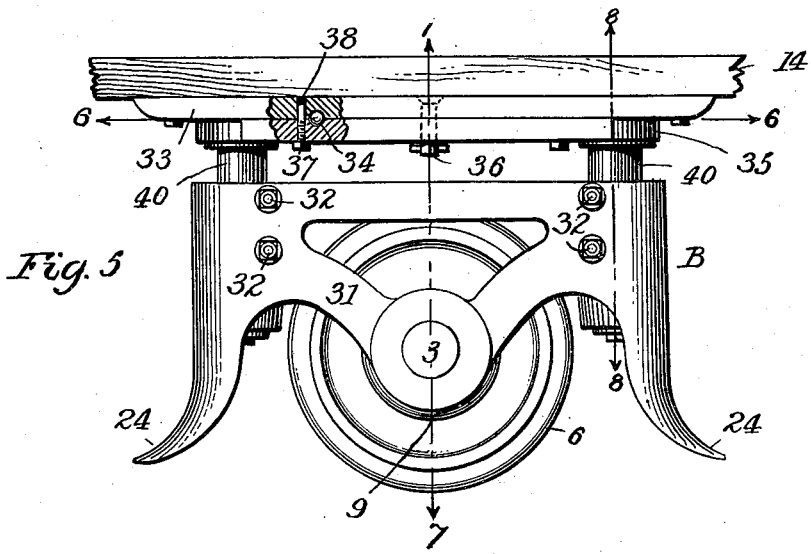
Figure 6:
Figure 7:
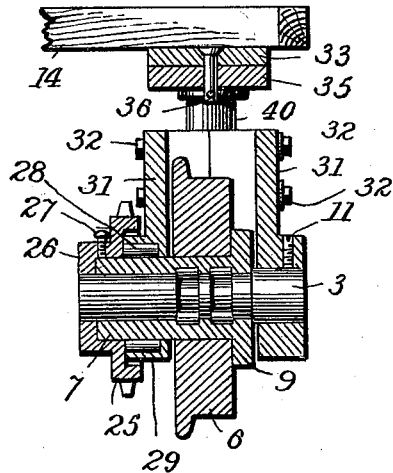
Figure 8:
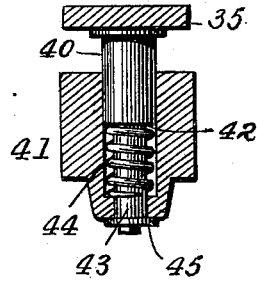

In the accompanying drawings, Figure 1 is a side elevation of a two-wheeled truck embodying my invention, a portion being broken away. Fig. 2 is a plan view looking downward from the line 2 2 of Fig. 1. Figs. 3 and 4 are sections on the lines 3 3 and 4 4 of Fig. 1, respectively. Fig. 5 is a side view of a single-wheeled truck embodying the invention. Fig. 6 is a sectional plan taken on the line 6 6 of Fig. 5. Figs. 7 and 8 are sections on the lines 7 7 and 8 8 of Fig. 5, respectively.

Referring to Figs. 1 to 4, inclusive, of the drawings, A indicates a two-wheeled truck, the wheels being arranged tandem. The frame of the truck is composed of two side frames or plates 1, united by suitable bolts 2. In the side frames 1 are rigidly mounted bearings 3, which are preferably provided with grooves 4 for roller-bearings 5. The car-wheels 6 are provided with internal boxes 7, which, as shown, are also furnished with grooves 8 for the roller-bearings. The boxes are made in two parts, as shown in Fig. 1, to permit the rollers to be inserted in the bearings, and they have flanges 9, which fit against the faces of the wheels and which are attached to the wheels by screws 10 or other suitable devices. The boxes should fit closely within the wheels, but not so tight as to prevent them from being removed to inspect the bearings when it is desired to do so. The bearings 3 may be fastened in the frames 1 in any suitable manner, as by the set-screws 11.

As shown in Figs. 1 and 3, there are four spring-boxes 12 formed in the side frames. The car-body 14 is supported upon a plate 15, which in turn rests upon ball-bearings 16, which run in grooves in a plate 17, the plate 15 having a bolt 18, upon which the plate 17 and the truck are pivoted. The bolt 18 extends down through the truck-frame and has a nut or head 19 at its lower end. Rigidly connected to the plate 17 are four plungers 20, which fit in spring-boxes 21, and springs 21ª are interposed between shoulders 22 on the plungers and the bottoms of the boxes. The plungers pass through the bottoms of the boxes and have heads or collars 23 below the same to limit their upward movement.

The side frames 1 extend around the wheels at the ends and inclose them, and they are provided at each end with integral wheel-guards 24, extending downwardly and outwardly, as shown in Fig. 1.

The box 7 and bearing 3 extend out through one of the side frames, and upon the end of the box is mounted a sprocket or other driving wheel 25. The wheel is preferably cast with a cup 26, into which the ends of the two-part box 7 fit, the wheel being clamped to the box by a suitable set-screw 27, which at the same time clamps the two parts of the box together.

Between the side frame and the sprocket-wheel are roller-bearings 28, included between a fixed flange 29 on the side frame 1 and the outer surface of the box 7. These bearings, being directly under the flange of the driving-wheel, take the strain which is imparted to the wheel when the car is in use, so that the bearings 5 are only required to bear the weight of the car.

In Figs. 5 to 8, inclusive, I have shown a different form of the invention, in which each truck is provided with a single wheel. In these figures the truck-frame B consists of two side frames 31, connected together by suitable bolts 32. As shown in Fig. 1, the car-body 14 rests upon a plate 33, which plate in turn rests upon ball-bearings 34, the balls running in grooves in a plate 35. The two plates 33 35 are pivotally connected at their center by a pivot-bolt 36. The amount of movement which the upper plate may make upon the pivot is limited by a pin 37, connected with the plate 35 and passing into a slot 38 in the upper plate. The ball-bearings 34 run in curved grooves 39, as shown in Fig. 6. Upon the ends of the plate 35 are a pair of plungers 40, which work vertically in sockets 41 at the ends of the frame. The plungers 40 are provided with shoulders 42 and reduced portions 43, which pass through the bottom of the spring-box or socket. Between the bottom of the boxes and the shoulders are spiral springs 44. The plungers are prevented from rising beyond the proper limit by means of heads or collars 45, suitably connected.

The construction of the wheel 6, the box 7, the sprocket or driving wheel 25, and their several bearings is the same in the single-wheeled truck as in the double-wheeled truck heretofore described, and a detailed description of them may be omitted.

In Fig. 7 I have shown the bearing 3 directly connected to the side frame by the set-screw 11. In Fig. 4 the bearing is connected to a hub 46, which has a flange 47, connected to the side frame 1 by suitable bolts 48. The hub fits into an opening in the side frame, which opening is large enough to permit the flanges of the boxes 7 to pass, the object being to provide means whereby the boxes and the wheel may be removed without separating the frame of the truck. Thus when the hub 46 is disconnected from the side frame the bearing 3 and the box 7 may be readily withdrawn through the opening in the frame, and of course the wheel 6 will then be disconnected and may then be removed.

It will be evident that my invention may be embodied in various forms without departing from its spirit and scope. Thus the truck-frame shown in Fig. 5 could be extended in both directions and provided with an extra wheel at each end, the spring-boxes and other connections remaining the same, thus providing a three-wheeled truck. In other words, my improved truck can be used with one or more springs and may have one or more wheels.

My improved truck has several advantages over the ordinary forms of car-trucks at present employed. It is chiefly designed to be used on electric and other tramway cars, and among its advantages are its simplicity and cheapness and also the ease with which it will adapt itself to curves of any radius. Furthermore, in passing around curves there is no slip to any of the wheels, as they all rotate independently. For electric and other motor cars the power may be communicated to the wheels through sprocket-wheels, as shown in Figs. 4, 5, and 7, or in any other suitable manner. It will be noticed that the wheel-guards 24 are provided with slight additional expense and that they are strong and rigid, being cast integral with the truck-frame. When cars are provided with my improved trucks, wheel guards or fenders only are necessary, as the intermediate space between the trucks and below the car-body is quite free from all interference, there being no axles extending across it, as is customary in other cars.

Having fully described my invention, what I claim, and desire to secure by Letters Patent, is—

1. In a car-truck, the combination with a pair of side frames, of one or more spring-pockets in said frames, a spring in each pocket and a plunger resting upon the spring, one or more bearings rigidly connected to one of said side frames and a single wheel mounted to rotate upon each bearing, substantially as described.

2. A car-truck consisting of a pair of side frames, fitting together and connected by suitable bolts, one or more bearings rigidly connected to one of said frames and a single wheel on each bearing, each wheel being located between the side frames and arranged to turn freely upon the bearing, substantially as described.

3. In a car-truck, a pair of side frames connected together by suitable bolts, one or more bearings connected to the truck and provided with single wheels between the side frames, one or more spring-pockets in the side frames of the truck, springs in said pockets and plungers resting upon the springs, said plungers being adapted to support the car body, substantially as described.

4. In a car-truck, the combination with two side frames rigidly connected together, one or more bearings rigidly connected to one of said frames, a two-part box mounted to rotate on each bearing, rollers between the box and the bearing and a wheel mounted on the box, substantially as described.

5. In a car-truck, the combination of the two side frames, the bearing rigidly connected to one of said side frames and extending through the other, the two-part box upon the bearing, the sprocket or driving wheel upon the outer end of the box and the car-wheel upon the box between the side frames, substantially as described.

6. In a car-truck, the combination of the two side frames, the bearing rigidly connected to one of said frames and extending through the other, the two-part box surrounding the bearing, the sprocket or driving wheel upon the outer end of the box and having a cup-shaped hub which embraces the box, and roller-bearings between the box and the frame adjacent to the driving-wheel, substantially as described.

7. The combination of the car-body, the plate connected to the car-body, a second plate pivoted to the first, suitable ball-bearings between said plates, plungers connected to the lower plate and a car-truck having spring-boxes through which the plungers extend, and coiled springs upon which the plungers are supported, substantially as described.

8. In a car-truck, a pair of side frames connected together, one or more wheels mounted between said frames upon suitable bearings and two-part wheel-fenders, the parts being formed integral respectively with the ends of the two side frames and extending downward and outward into proximity with the rail, substantially as described.

In testimony whereof I affix my signature in presence of two witnesses.

MICHEAL F. NORACONK.

Witnesses:
JAMES A. WATSON,
ROBERT WATSON.